US010296218B2

(12) United States Patent
Nishijo et al.

(10) Patent No.: US 10,296,218 B2
(45) Date of Patent: May 21, 2019

(54) UPDATE CONTROL METHOD, UPDATE CONTROL APPARATUS, AND STORAGE MEDIUM

(71) Applicant: FUJITSU LIMITED, Kawasaki-shi, Kanagawa (JP)

(72) Inventors: Hiroaki Nishijo, Kawasaki (JP); Kenji Uchiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 15/617,690

(22) Filed: Jun. 8, 2017

(65) Prior Publication Data

US 2018/0046379 A1 Feb. 15, 2018

(30) Foreign Application Priority Data

Aug. 10, 2016 (JP) ................................ 2016-157791

(51) Int. Cl.
*G06F 9/445* (2018.01)
*G06F 3/06* (2006.01)
(Continued)

(52) U.S. Cl.
CPC ............ *G06F 3/0607* (2013.01); *G06F 3/065* (2013.01); *G06F 3/067* (2013.01); *G06F 8/65* (2013.01);
(Continued)

(58) Field of Classification Search
CPC .... G06F 8/65; G06F 11/1433; G06F 11/1417; G06F 3/0607; G06F 3/067; G06F 3/065;
(Continued)

(56) References Cited

U.S. PATENT DOCUMENTS

2004/0187025 A1* 9/2004 Tachiyama ............ H04L 41/082 726/4
2005/0055595 A1 3/2005 Frazer et al.
(Continued)

FOREIGN PATENT DOCUMENTS

| | | |
|---|---|---|
| JP | 2005-502971 | 1/2005 |
| JP | 2012-073862 | 4/2012 |
| JP | 2014-167692 | 9/2014 |

OTHER PUBLICATIONS

Cristiano Guiffrida et al., Safe and Automatic Live Update for Operating Systems, ACM, 2013, retrieved online on Feb. 28, 2019, pp. 279-291. Retrieved from the Internet: <URL: http://delivery.acm.org/10.1145/2460000/2451147/p279-giuffrida.pdf?>. (Year: 2013).*

*Primary Examiner* — Hanh Thi-Minh Bui
(74) *Attorney, Agent, or Firm* — Fujitsu Patent Center

(57) ABSTRACT

An update control method executed by a processor included in an update control apparatus configured to update control programs respectively set up in a plurality of computers, the update control method includes acquiring update information and new control programs, the update information indicating update priority of the control programs of the plurality of computers and a progress status of the update; providing the new control programs to the plurality of computers; updating the progress status included in the update information based on information about a computer with the update of the control program completed among the computers; determining, based on the updated progress status, timings to reboot the plurality of respective computers such that the control programs of the plurality of computers are updated according to the update priority indicated by the update information; and updating the control programs of the plurality of computers based on the determined timings.

9 Claims, 14 Drawing Sheets

A171 AGENT
171 MAIN UNIT
OPERATION STATE CHECK AND RESPONSE S121
DETERMINE WHETHER MAINTENANCE MODE SETTING IS EXECUTABLE S122
MAINTENANCE MODE SETTING AND RESPONSE S123
201b
DETERMINE WHETHER FW ACQUISITION IS EXECUTABLE S124
RECEPTION MODE SETTING AND RESPONSE S125
PROGRESS MANAGEMENT TABLE
FW TRANSMISSION AND RESPONSE S126
DETERMINE WHETHER FW INSTALLATION IS EXECUTABLE S127
INSTALLATION SETTING AND RESPONSE S128
DETERMINE WHETHER REBOOTING IS EXECUTABLE S129
INSTRUCTION TO REBOOT AND RESPONSE S130
DETERMINE WHETHER MAINTENANCE MODE TERMINATION IS EXECUTABLE S131
MAINTENANCE MODE TERMINATION AND RESPONSE S132

(51) Int. Cl.
*G06F 9/4401* (2018.01)
*G06F 8/65* (2018.01)
*G06F 11/14* (2006.01)
*G06F 8/654* (2018.01)

(52) U.S. Cl.
CPC ............ *G06F 9/4401* (2013.01); *G06F 8/654* (2018.02); *G06F 11/1417* (2013.01); *G06F 11/1433* (2013.01)

(58) Field of Classification Search
CPC ............ G06F 9/4401; H04M 1/72525; H04M 2203/052
See application file for complete search history.

(56) References Cited

U.S. PATENT DOCUMENTS

2013/0198731 A1* 8/2013 Inai .......................... G06F 8/65 717/170
2014/0245283 A1 8/2014 Tanaka
2014/0304696 A1* 10/2014 Rantanen .................. G06F 8/65 717/169
2015/0134806 A1* 5/2015 Zou .................... G06F 11/1417 709/223

* cited by examiner

| COMPONENT | UNIT | TYPE (PARENT AGENT) | AGENT | FW VERSION (UPDATE) |
|---|---|---|---|---|
| 107 | 171 | MAIN | A171 | V01 |
| 108 | 181 | MAIN | A181 | V01 |
| | 182 | SUB (A181) | A182 | V01 |

| PROGRESS INFORMATION | | AGENT | | |
|---|---|---|---|---|
| | | A171 | A181 | A182 |
| FW VERSION | UPDATE | V01 | V01 | V01 |
| | OPERATION | 0 | 0 | 0 |
| MAINTENANCE MODE SETTING | PRIORITY | 30 | 20 | 21 |
| | STATE | 0 | 0 | 0 |
| FW ACQUISITION | PRIORITY | 99 | 40 | 41 |
| | STATE | 0 | 0 | 0 |
| FW INSTALLATION | PRIORITY | 10 | 30 | 31 |
| | STATE | 0 | 0 | 0 |
| REBOOTING | PRIORITY | 0 | 30 | 31 |
| | STATE | 0 | 0 | 0 |
| MAINTENANCE MODE TERMINATION | PRIORITY | 20 | 20 | 21 |
| | STATE | 0 | 0 | 0 |
| UPDATE COMPLETION | | 0 | 0 | 0 |

FIG. 9

DESCRIPTION OF CODE VALUE (CODE TABLE)

| CODE VALUE | MEANING | |
|---|---|---|
| | PRIORITY SPECIFYING CODE | OPERATION STATE CODE |
| 99 | EXECUTE NO PROCESSING EXCLUDED FROM START DETERMINATION | PROCESSING IS TERMINATED |
| 0 | EXECUTE PROCESSING (ON NO PRECEDENT CONDITIONS) | PROCESSING IS NOT EXECUTED (OR EXECUTED ON NO CONDITION) |
| 10 | EXECUTE PROCESSING WITH FIRST PRIORITY | PROCESSING IS IN EXECUTION (FIRST PRIORITY) |
| 11 - 19 | EXECUTION PRIORITY OF AGENT (SUB) (IN FIRST AGENT) | PROCESSING IS IN EXECUTION (AGENT (SUB)) |
| ⋮ | ⋮ | ⋮ |

UPDATE CONTROL METHOD, UPDATE CONTROL APPARATUS, AND STORAGE MEDIUM

CROSS-REFERENCE TO RELATED APPLICATION

This application is based upon and claims the benefit of priority of the prior Japanese Patent Application No. 2016-157791, filed on Aug. 10, 2016, the entire contents of which are incorporated herein by reference.

FIELD

The embodiments discussed herein are related to an update control method, an update control apparatus, and a storage medium.

BACKGROUND

A computer system used to process or store data includes various processing elements (components). In a computer system including plural computers coupled to each other through a network, for example, the computers may serve as components of the computer system. A control device, a storage device, a communication device, a power device, and the like mounted on each computer may serve as components of the computer.

Each of the aforementioned components operates, for example, in accordance with firmware previously set up depending on functions to be provided by the component, for example. The firmware is an example of control programs controlling operations of the components. In many computer systems, plural components work collaboratively. Accordingly, updating firmware set up in one of the components may influence the operation of another component in some cases.

Firmware of the components is updated as appropriate to improve the functions and security. To avoid a risk that update of firmware of some components destabilizes operations of the other components and causes a failure, there is a method of updating firmware of all the relevant components at the same time, for example.

However, if the firmware of plural components is updated at the same time but in an incorrect order, the firmware of some components may fail to be updated correctly, and the components may not operate correctly after the update.

As a method of updating firmware of plural image processing apparatuses, a method is proposed which determines update priority based on a function to be updated. In another proposed method, the update priority is determined based on compatibility between engine firmware and an update module. Moreover, a method is also proposed which determines a proper time to reboot an electronic device in the process of updating the firmware of the electronic device. In this method, the time proper to reboot the electronic device is determined depending on the conditions of the electronic device (time period taken to execute a process being executed or the like). Examples disclosed as related art include Japanese Laid-open Patent Publication Nos. 2014-167692 and 2012-73862, Japanese National Publication of International Patent Application No. 2005-502971, and others.

In the case where the update priority is given as described above, successive update processes are executed by: setting a waiting time for a subsequent update process to a time obtained by adding a margin to a predicted value of a time period taken to execute the preceding update process; and starting the subsequent update process upon lapse of the set waiting time after the preceding update process starts. In a computer system requested to achieve high reliability, the margin is set long to reduce the risk of failure in updating firmware. Accordingly, it takes long to update the firmware. It is therefore desirable to speed up update of all the control programs at the same time.

SUMMARY

According to an aspect of the invention, an update control method executed by a processor included in an update control apparatus configured to update control programs respectively set up in a plurality of computers, the update control method includes acquiring update information and new control programs to be provided to the plurality of respective computers, the update information indicating update priority of the control programs of the plurality of computers and a progress status of the update; providing the new control programs to the plurality of computers; updating the progress status included in the update information based on information about a computer with the update of the control program completed among the computers; determining, based on the updated progress status, timings to reboot the plurality of respective computers such that the control programs of the plurality of computers are updated according to the update priority indicated by the update information; and updating the control programs of the plurality of computers based on the determined timings.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a progress management table according to the second embodiment;

FIG. 9 is a diagram illustrating an example of a code table according to the second embodiment;

DESCRIPTION OF EMBODIMENTS

Figure 1:
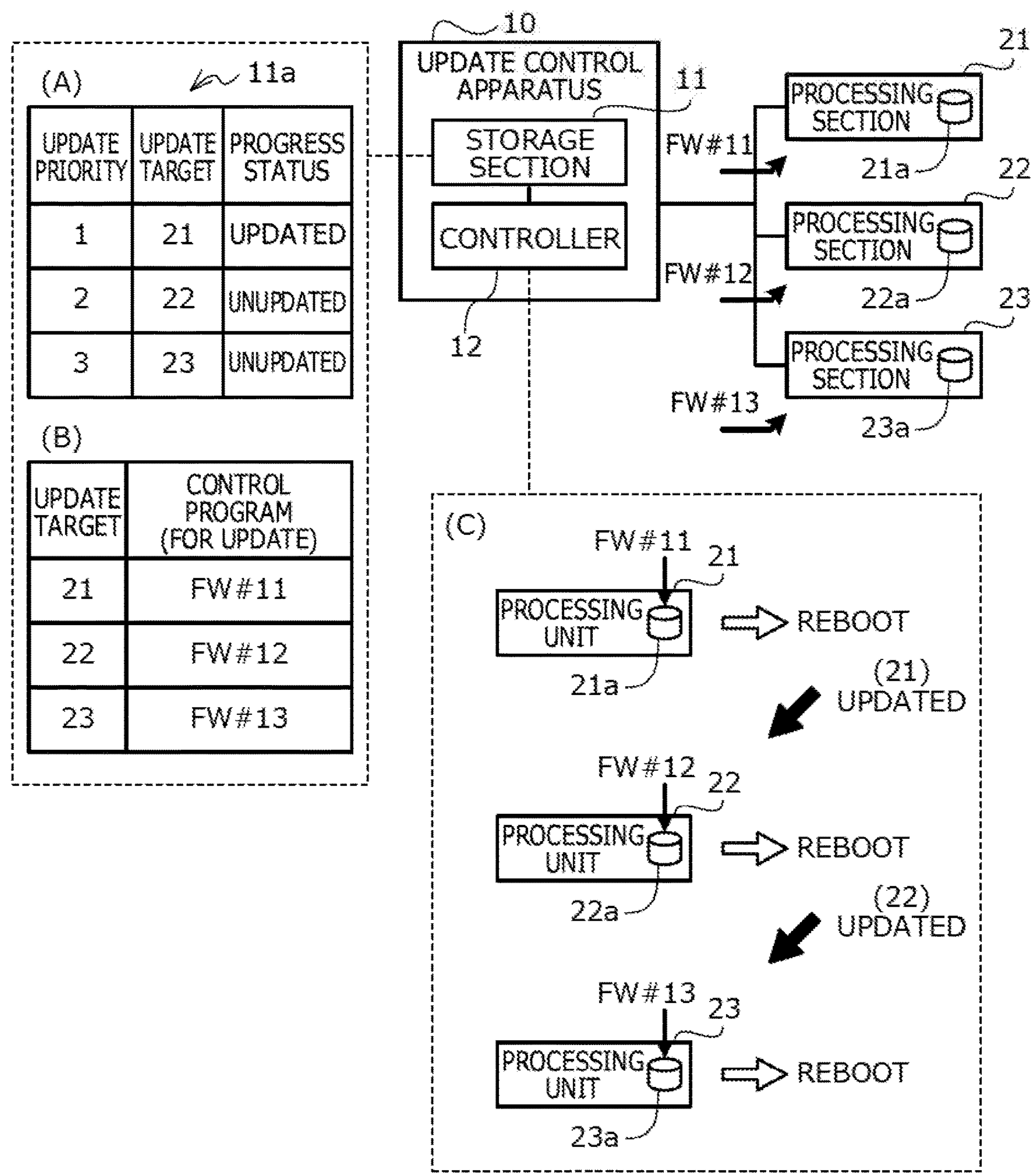
FIG. 1 is a diagram illustrating an example of an update control apparatus according to a first embodiment.

Hereinafter, a description is given of embodiments with reference to the accompanying drawings. Elements including the substantially same functions in the specification and drawings are given the same reference numerals, and redundant description is omitted in some cases.

First Embodiment

With reference to FIG. 1, a description is given of a first embodiment. The first embodiment relates to a method of simultaneously updating control programs set up in plural processing sections. FIG. 1 is a diagram illustrating an example of an update control apparatus according to the first embodiment. An update control apparatus 10 illustrated in FIG. 1 is an example of the update control apparatus according to the first embodiment.

As illustrated in FIG. 1, the update control apparatus 10 includes a storage section 11 and a controller 12.

The storage section 11 is a volatile storage device such as a random access memory (RAM) or a non-volatile storage device such as a hard disk drive (HDD) or a flash memory. The controller 12 is a processor such as a central processing unit (CPU), a digital signal processor (DSP), or a field programmable gate array (FPGA). The controller 12 executes a program stored in the storage section 11 or another memory, for example.

The update control apparatus 10 updates control programs individually set up in processing sections 21, 22, 23. Examples of the processing sections 21, 22, 23 are one or plural computers themselves or components included in the computers.

Examples of the aforementioned components include controller modules (CMs), basic input/output system (BIOS) chips, and local area network (LAN) interface cards. Examples of the aforementioned components further include small computer system interface (SCSI) controllers, redundant arrays of inexpensive disks (RAID) controllers, and fiber channel (FC) interface cards.

The storage section 11 stores update information 11*a* and new control programs to be provided to the processing sections 21, 22, 23. The update information 11*a* is information indicating update priority of the control programs in the processing sections 21, 22, 23 and the progress status of the update.

As illustrated in (A) of FIG. 1, the update information 11*a* includes the update priority, information identifying the processing sections to be updated, and progress information, which are associated with each other, for example. In the example of FIG. 1, for convenience of description, the information identifying the processing sections to be updated is indicated by numerals. The progress status includes "updated" indicating that update of the control program is already completed and "unupdated" indicating that update of the control program is not completed.

The new control programs are prepared for the processing sections 21, 22, 23 to be updated as illustrated in (B) of FIG. 1. In the example of FIG. 1, control programs FW#11, FW#12, FW#13 are prepared for the processing sections 21, 22, 23, respectively. An example of the control programs is firmware controlling the operation of computers or aforementioned components.

The controller 12 provides new control programs to the processing sections 21, 22, 23. The processing sections 21, 22, 23 include storage areas 21*a*, 22*a*, 23*a* for storing control programs, respectively. The storage areas 21*a*, 22*a*, 23*a* are areas on memories (not illustrated) included in the processing sections 21, 22, 23, respectively.

In the example of FIG. 1, the control program FW#11 is provided from the controller 12 to the processing section 21. The processing section 21 which has received the control program FW#11 stores the control program FW#11 in the storage area 21*a*. The control program FW#11 stored in the storage area 21*a* is read at restart of the processing section 21. The restarted processing section 21 operates in accordance with the control program FW#11 read from the storage area 21*a*.

The control program FW#12 is provided from the controller 12 to the processing section 22. The processing section 22 which has received the control program FW#12 stores the control program FW#12 in the storage area 22*a*. The control program FW#12 stored in the storage area 22*a* is read at restart of the processing section 22. The restarted processing section 22 operates in accordance with the control program FW#12 read from the storage area 22*a*. The same applies to the processing section 23.

The controller 12 records information about the processing section which has completed the update among the processing sections 21, 22, 23 as the progress status. For example, when the provision of the control program FW#11 for the processing section 21 and the rebooting of the processing section 21 are completed, the controller 12 records "updated" in the progress status field corresponding to the processing section 21 in the update information 11*a*.

Based on the progress status, the controller 12 controls the timings to reboot the plural processing sections 21, 22, 23 such that the control programs are updated in the order of update priority indicated by the update information 11*a*. As illustrated in (C) of FIG. 1, after providing the control programs FW#11, FW#12, FW#13 to the processing sections 21, 22, 23, respectively, the controller 12 gives a permission to reboot to the processing section 21, with the update priority set to "1", for example.

After the processing section 21 reads the control program FW#11 and starts operating, the controller 12 updates the update information 11*a* and gives a permission to reboot to the processing section 22, with the update priority set to "2". After the processing section 22 reads the control program FW#12 and starts operating, the controller 12 updates the update information 11*a* and gives a permission to reboot to the processing section 23, with the update priority set to "3". After the processing section 23 reads the control program FW#13 and starts operating, the controller 12 updates the update information 11*a*.

In the example of FIG. 1, the levels of update priority are defined as 1, 2, 3, which are assigned to the respective processing sections to be updated. However, when plural processing sections are able to be updated simultaneously, the plural processing sections may be assigned to the same level of update priority. In the case where the processing sections 22, 23 are assigned to the update priority of "2", after the processing section 21 reads the control program FW#11 and starts operating, the controller 12 updates the update information 11*a*. The controller 12 then gives a permission to reboot to the processing sections 22, 23 simultaneously.

As described above, by using the update information 11*a*, the control programs of the plural processing sections are able to be updated together safely and efficiently.

For example, it is assumed that the control program FW#12 is able to be updated on the condition that the control program FW#11 is already updated. Update of the control program FW#12 fails if the process to update the control program FW#12 is executed before completion of update of the control program FW#11. However, such a failure is avoided by using the update information 11*a*. Moreover, the control programs are sequentially updated based on the update information 11*a*, contributing to speeding up of the update process.

Second Embodiment

Next, a description is given of a second embodiment. The second embodiment relates to a method of updating firmware (FW) in a virtual tape library system.

Figure 2:
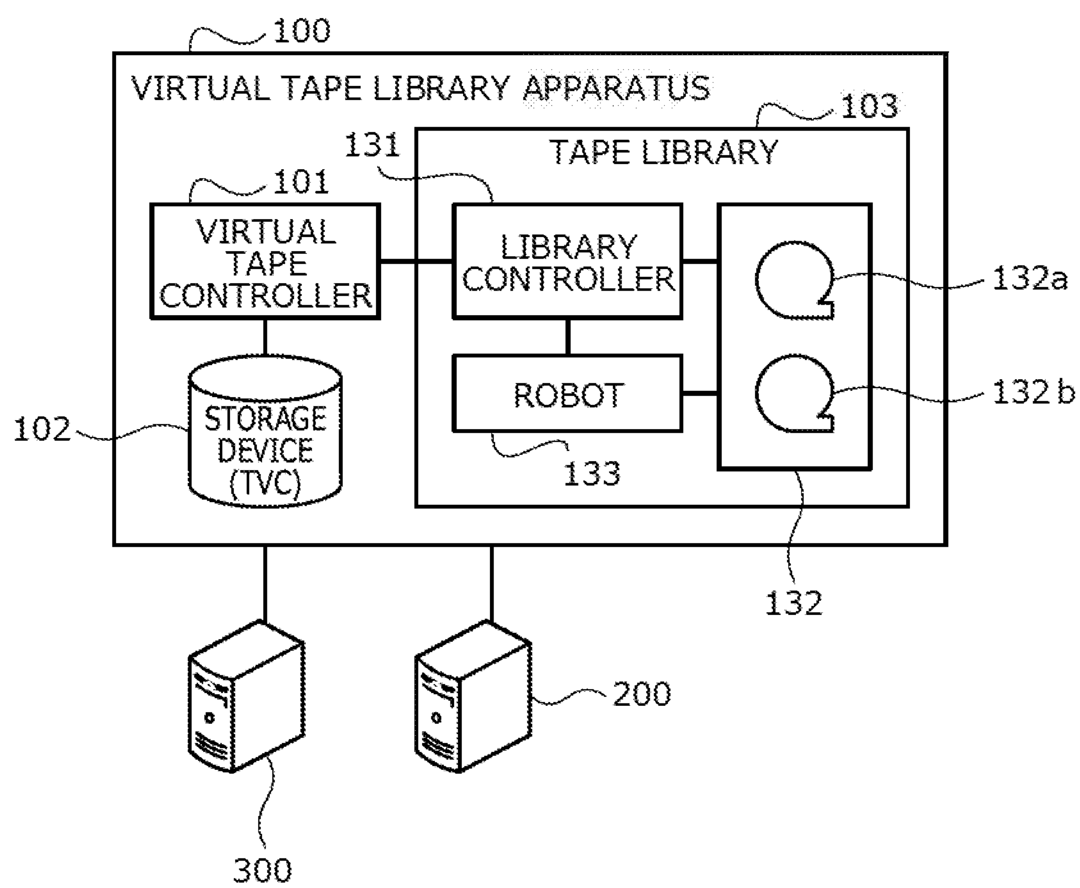
FIG. 2 is a diagram illustrating an example of a virtual tape library system according to a second embodiment.

With reference to FIG. 2, a description is given of the virtual tape library system according to the second embodiment. FIG. 2 is a diagram illustrating an example of the virtual tape library system according to the second embodiment.

As illustrated in FIG. 2, the virtual tape library system according to the second embodiment includes a virtual tape library apparatus 100, a monitor server 200, and a host computer 300. The virtual tape library apparatus 100 includes a virtual tape controller 101, a storage device 102, and a tape library 103.

The monitor server 200 is a computer configured to monitor the update situation of FW in the virtual tape library apparatus 100 and control the timing to update FW. The host computer 300 is a computer configured to request the virtual tape library apparatus 100 to read and write data. The virtual tape library apparatus 100 is a device configured to be requested by the host computer 300 to read and write data.

The tape library 103 includes a library controller 131, a tape drive 132, and a robot 133. The library controller 131 controls the tape drive 132 and robot 133 and reads and writes data from and in tapes 132*a*, 132*b*. The tapes 132*a*, 132*b* are magnetic tape media in which data is recorded.

Herein, for convenience of explanation, the magnetic tape media are illustrated by way of example. However, the technique of the second embodiment is applicable to systems using optical disks such as digital versatile discs (DVDs) or Blu-ray Discs (registered trademark, BDs).

The tape drive 132 is a drive device configured to write data in the tapes 132*a*, 132*b* and read data from the tapes 132*a*, 132*b*. The robot 133 is a device configured to take a magnetic tape medium from a storage rack storing magnetic tape media including the tapes 132*a*, 132*b* and load the taken magnetic tape medium on the tape drive 132. The library controller 131 controls the operation of the tape library 103 under the control by the virtual tape controller 101.

The storage device 102 is a RAID device including plural recording media combined for redundancy, such as HDDs or solid state drives (SSDs). Accordingly, it is possible to read and write data in the storage device 102 faster than in the magnetic tape media. The storage device 102 includes an RAID controller. The storage device 102 is used as a cache to temporarily store data which is to be written in the tape library 103 (tape volume cache, TVC).

When requested by the host computer 300 to write data in the tape library 103, for example, the virtual tape controller 101 stores the data in the storage device 102 temporarily. When requested by the host computer 300 to read data which is stored in the storage device 102, the virtual tape controller 101 responds to the host computer 300 using the data in the storage device 102.

Use of the storage device 102 as a cache, as described above, speeds up the response to the host computer 300. The virtual tape controller 101 moves the data in the storage device 102 to the tape library 103 at a previously determined timing (a timing when a condition such as the end of a predetermined period of time or a remaining capacity of the storage device 102 is satisfied, for example).

Figure 3:
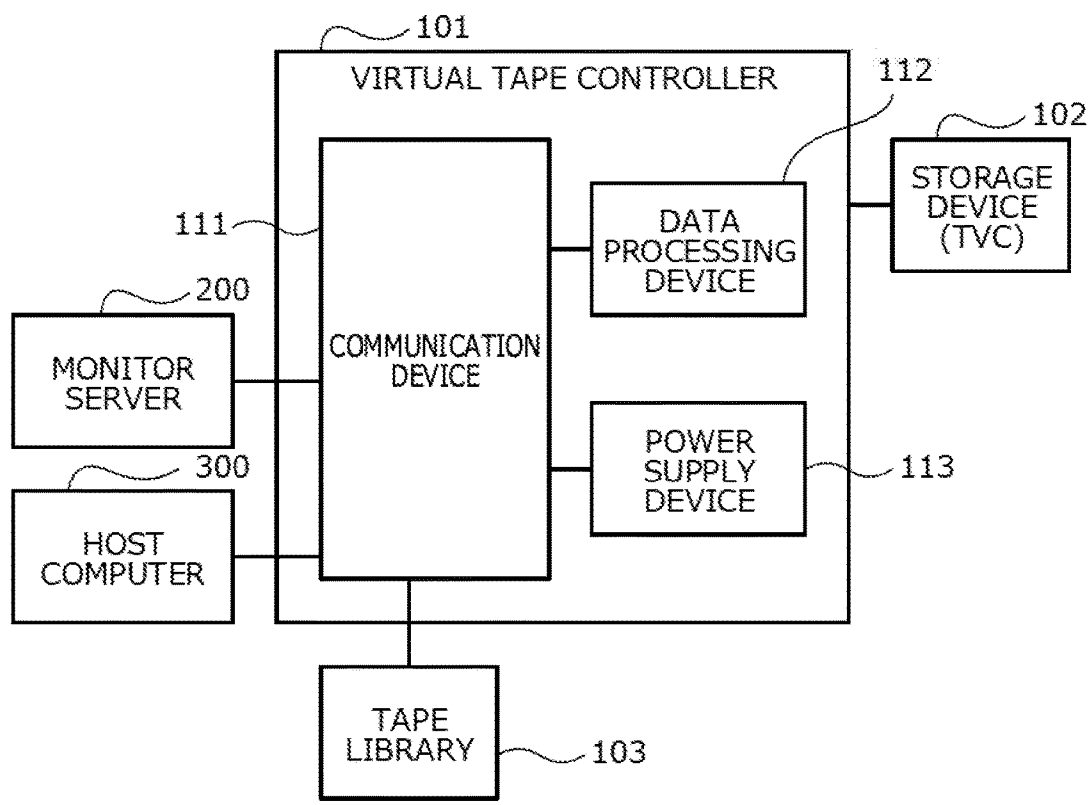
FIG. 3 is a diagram illustrating an example of hardware of the virtual tape library system according to the second embodiment.

The hardware of the aforementioned virtual tape controller 101 includes hardware elements as illustrated in FIG. 3, for example. FIG. 3 is a diagram illustrating an example of hardware of the virtual tape controller according to the second embodiment. The hardware illustrated in FIG. 3 is an example. Some of the elements may be replaced depending on the structure and intended use of the virtual tape library system.

As illustrated in FIG. 3, the virtual tape controller 101 includes a communication device 111, a data processing device 112, and a power supply device 113.

Examples of the communication device 111 include an LAN interface card, an FC interface card, and an SCSI controller. The communication device 111 is a device used in communication with the monitor server 200, host computer 300, and tape library 103. The data processing device 112 is a device including a data processing function, such as a CPU, an FPGA, or a CM. The power supply device 113 is a device including power supply functions such as turning on and off the power supply, controlling the voltage, and controlling power saving.

Figure 4:
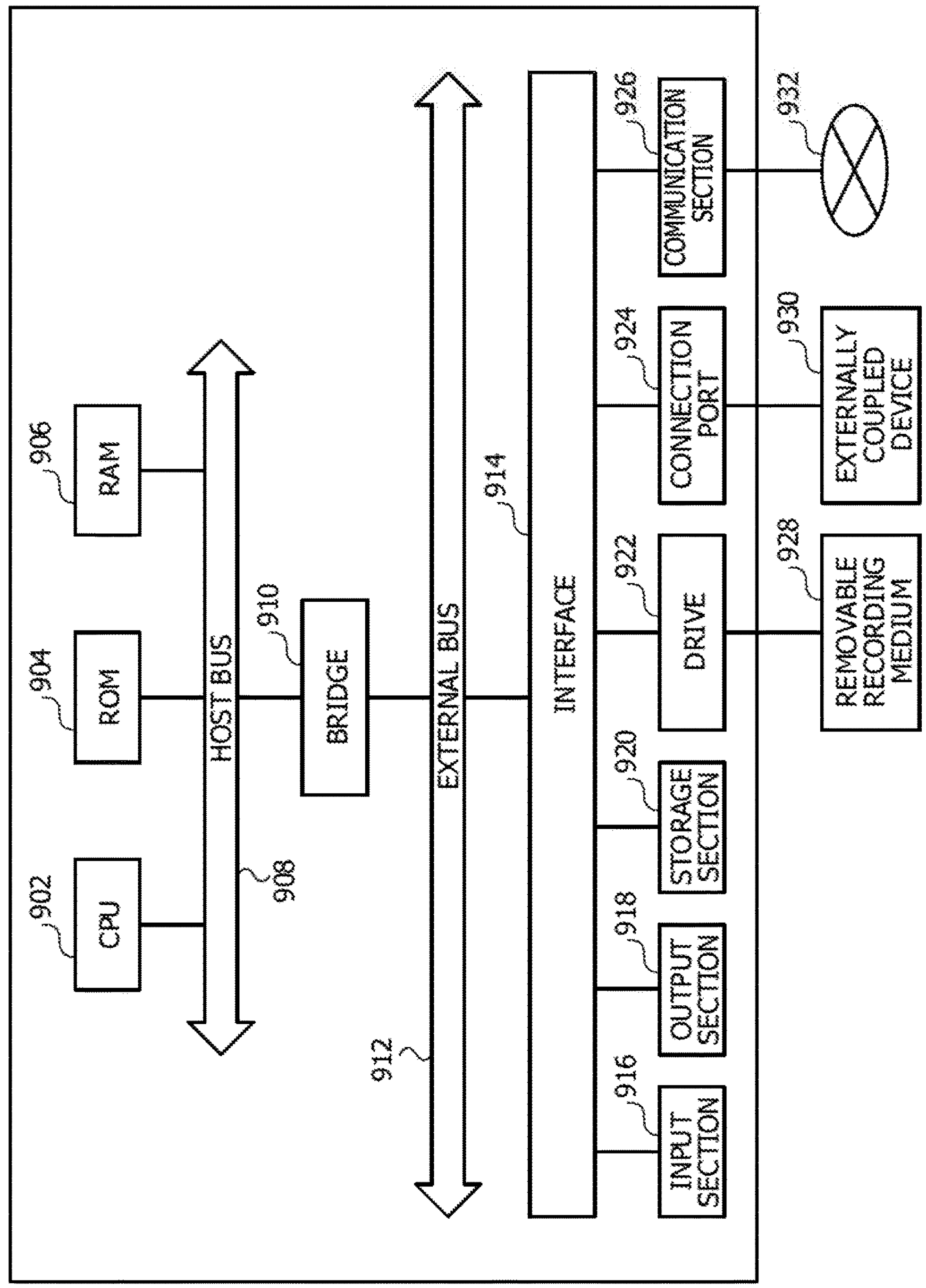
FIG. 4 is a diagram illustrating an example of hardware of a monitor server according to the second embodiment.

The function included in the aforementioned monitor server 200 may be implemented by using hardware of the computer illustrated in FIG. 4. FIG. 4 is a diagram illustrating an example of hardware of a monitor server according to the second embodiment. The functions included in the monitor server 200 are implemented by controlling the hardware illustrated in FIG. 4 using a computer program. The functions of the host computer 300 are also implemented using the hardware illustrated in FIG. 4.

As illustrated in FIG. 4, the hardware mainly includes a CPU 902, a read only memory (ROM) 904, a RAM 906, a host bus 908, and a bridge 910. The hardware further includes an external bus 912, an interface 914, an input section 916, an output section 918, a storage section 920, a drive 922, a connection port 924, and a communication section 926.

The CPU 902 functions as an arithmetic processing device or a controller, for example. The CPU 902 controls all or a part of the operations of each constituent component based on various types of programs recorded in the ROM 904, RAM 906, storage section 920, or a removable recording medium 928. The ROM 904 is an example of the storage device storing a program to be read by the CPU 902, data for use in arithmetic operation, and the like. The RAM 906 temporarily or permanently stores a program to be read by the CPU 902 or various parameters varying at execution of the program, for example.

These elements are coupled to each other through the host bus 908 capable of performing fast data transmission, for example. On the other hand, the host bus 908 is coupled through the bridge 910 to the external bus 912 of a comparatively low data transmission rate. The input section 916 is a mouse, a key board, a touch panel, a touch pad, or the like, for example.

The output section 918 is a printer or a display device such as a cathode ray tube (CRT), liquid crystal display (LCD), a plasma display panel (PDP), or an elector-luminescence display (ELD), for example.

The storage section 920 is a device configured to store various types of data. The storage section 920 is a magnetic storage device such as an HDD, for example. The storage section 920 may be a semiconductor storage device such as an SSD or a RAM disk, an optical storage device, or a magneto optical storage device.

The drive 922 is a device configured to read information recorded in the removable recording medium 928 as a detachable recording medium or write information in the removable recording medium 928. Examples of the removable recording medium 928 include a magnetic disk, an optical disk, a magneto optical disk, and a semiconductor memory.

The connection port 924 is a port to connect an externally coupled device 930, such as a Universal Serial Bus (USB) port, an IEEE 1394 port, a SCSI, or a RS-232C port, for example. The externally coupled device 930 is a printer or the like, for example.

The communication section 926 is a communication device for connection with the network 932. The communication section 926 is a communication circuit for wired or wireless LAN, a communication circuit for wireless USB (WUSB), a communication circuit or router for optical communication, a communication circuit or router for an asymmetric digital subscriber line (ADSL), or a communication circuit for a mobile telephone network, for example. The network 932 coupled to the communication section 926 is a network coupled by wire or wirelessly. The network 932 includes the Internet, LAN, or the like, for example.

As described above, the virtual tape library system includes various hardware elements. Many of the hardware elements operate according to FW. The second embodiment relates to a technique to update FW of the hardware elements.

In the case of simultaneously updating FW of plural hardware elements which are dependent on each other, there is a risk that some of the hardware elements do not operate normally if FW of the hardware elements is updated in an incorrect order. The order of update priority in the virtual tape library apparatus 100 is: the power supply device 113, storage device 102, communication device 111, tape library 103, and data processing device 112, for example.

The aforementioned order is just an example. The FW of the power supply device 113 is updated first because the power supply device 113 controls supply of power to each hardware element. The FW of the storage device 102 is updated prior to the FW of the virtual tape controller 101 and the tape library 103 because the virtual tape controller 101 and library controller 131 refer to the contents of the storage device 102. For the communication device 111 is used to provide FW, the FW of the communication device 111 is updated in gaps between communications after the provision of FW to the other elements is completed.

When the storage device 102 is operating normally, data to be transmitted from the host computer 300 to the virtual tape library apparatus 100 is able to be cached in the storage device 102. The FW of the tape library 103 is therefore updated at a proper time. At the startup of the tape library 103, a process to recognize the state of the tape drive 132 is executed. Accordingly, in the process of updating the FW of the tape library 103, the FW of the tape drive 132 is updated first, and the FW of the robot 133 is then updated.

When the FW of the tape drive 132 and robot 133 is updated and the tape drive 132 and robot 133 are operating normally, the FW of the library controller 131 is updated. The data processing device 112 recognizes the state of the tape library 103 at the startup. Accordingly, the FW of the data processing device 112 is updated after the FW of the tape library 103 is updated.

It is assumed that the data processing device 112 which is a FW update target includes a BIOS card, a LAN interface card, an FC interface card, and a RAID controller. In this case, FW of the BIOS, which controls input and output, is updated first, and then FW of the LAN and FC interface cards is updated. FW of the RAID controller is updated next. To update FW controlling the entire operation of the virtual tape controller 101, the update process thereof is executed after update of FW of the aforementioned hardware elements is completed.

In a system in which various hardware elements operate together as described above, FW update of the hardware elements is performed in an appropriate order. Accordingly, after update of FW of a hardware element which is expected to be updated first is completed, the process to update FW of a hardware element expected to be updated second is started. The method of controlling the order of update may employ a mechanism in which the update process is started upon lapse of a previously set waiting time after the start of the preceding update process, for example.

The waiting time is set long enough in a system requested to avoid a risk of update failure like the virtual tape library system. Accordingly, in the aforementioned mechanism, it takes long to complete the process to update FW of all of the hardware elements. Long halt of operation due to FW update degrades the user convenience. The virtual tape library system according to the second embodiment provides a mechanism to shorten the time taken to update FW by suitably managing the progress of the update processes instead of providing the waiting time.

Figure 5:
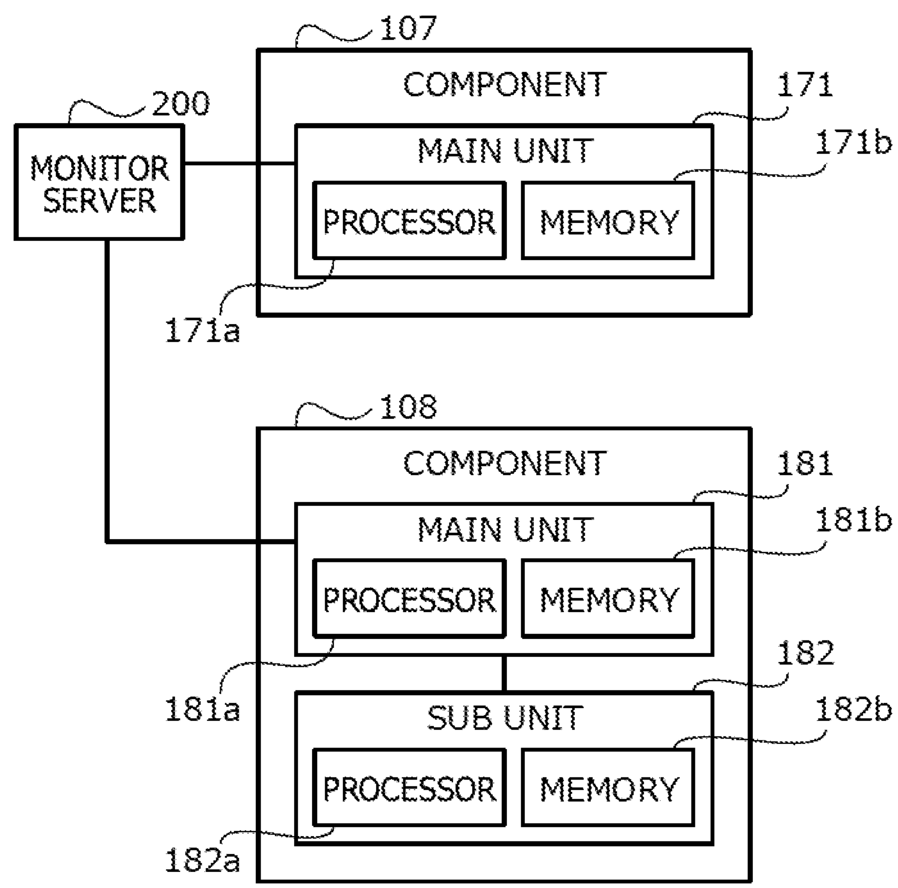
FIG. 5 is a diagram illustrating a component model used in explanation of firmware update control according to the second embodiment.

Hereinafter, the virtual tape library apparatus 100 is assumed to be a FW update target for ease of explanation. The hardware elements of the virtual tape library apparatus 100 are indicated by a component model illustrated in FIG. 5. FIG. 5 is a diagram illustrating a component model used in explanation of FW update control according to the second embodiment.

In the component model illustrated in FIG. 5, the hardware elements of the virtual tape library apparatus 100 are indicated by components 107, 108. The component 107 includes a main unit 171. The component 108 includes a main unit 181 and a subunit 182.

The component 107 corresponds to the virtual tape controller 101 or storage device 102, for example. The main unit 171 corresponds to the communication device 111, data processing device 112, power supply device 113, or the RAID controller of the storage device 102, for example. The component 108 corresponds to the tape library 103. The main unit 181 corresponds to the library controller 131. The subunit 182 corresponds to the tape drive 132 or robot 133. The aforementioned correspondence relationships are illustrated by way of example for convenience of explanation, and the relationships between the components, units, and hardware elements are not limited to the aforementioned relationships.

As illustrated in FIG. 5, the main unit 171 includes a processor 171*a* and a memory 171*b*. The main unit 181 includes a processor 181*a* and a memory 181*b*. The subunit 182 includes a processor 182*a* and a memory 182*b*. The memories 171*b*, 181*b*, 182*b* store FW. The processors 171*a*, 181*a*, 182*a* read FW stored in the memories 171*b*, 181*b*, 182*b* to control operations, respectively. The main units 171, 181 communicate with the monitor server 200.

Hereinafter, a description is given using the aforementioned component model.

Figure 6:
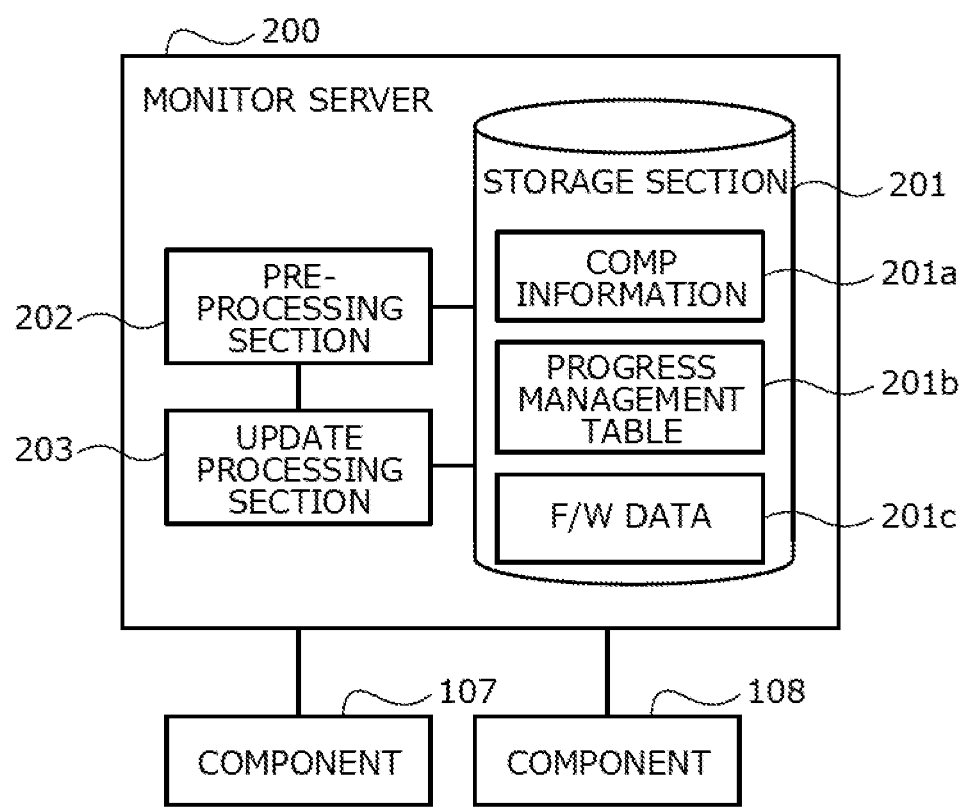
FIG. 6 is a diagram illustrating a functional example of the monitor server according to the second embodiment.

The functions of the monitor server 200 are described with reference to FIG. 6. FIG. 6 is a diagram illustrating a functional example of a monitor server according to the second embodiment.

As illustrated in FIG. 6, the monitor server 200 includes a storage section 201, pre-processing section 202, and an update processing section 203. The function of the storage section 201 is implemented using the aforementioned RAM 906, storage section 920, and the like. The functions of the pre-processing section 202 and update processing section 203 are implemented using the aforementioned CPU 902 and the like.

The storage section 201 stores COMP information 201*a*, a progress management table 201*b*, and FW data 201*c*. The COMP information 201*a* is information concerning the components 107, 108 as FW update targets. The progress management table 201*b* is a table for management of the FW update situation (the update priority and the progress status of a FW update process). The FW data 201*c* is a substance of FW provided to the components 107, 108.

Figure 7:
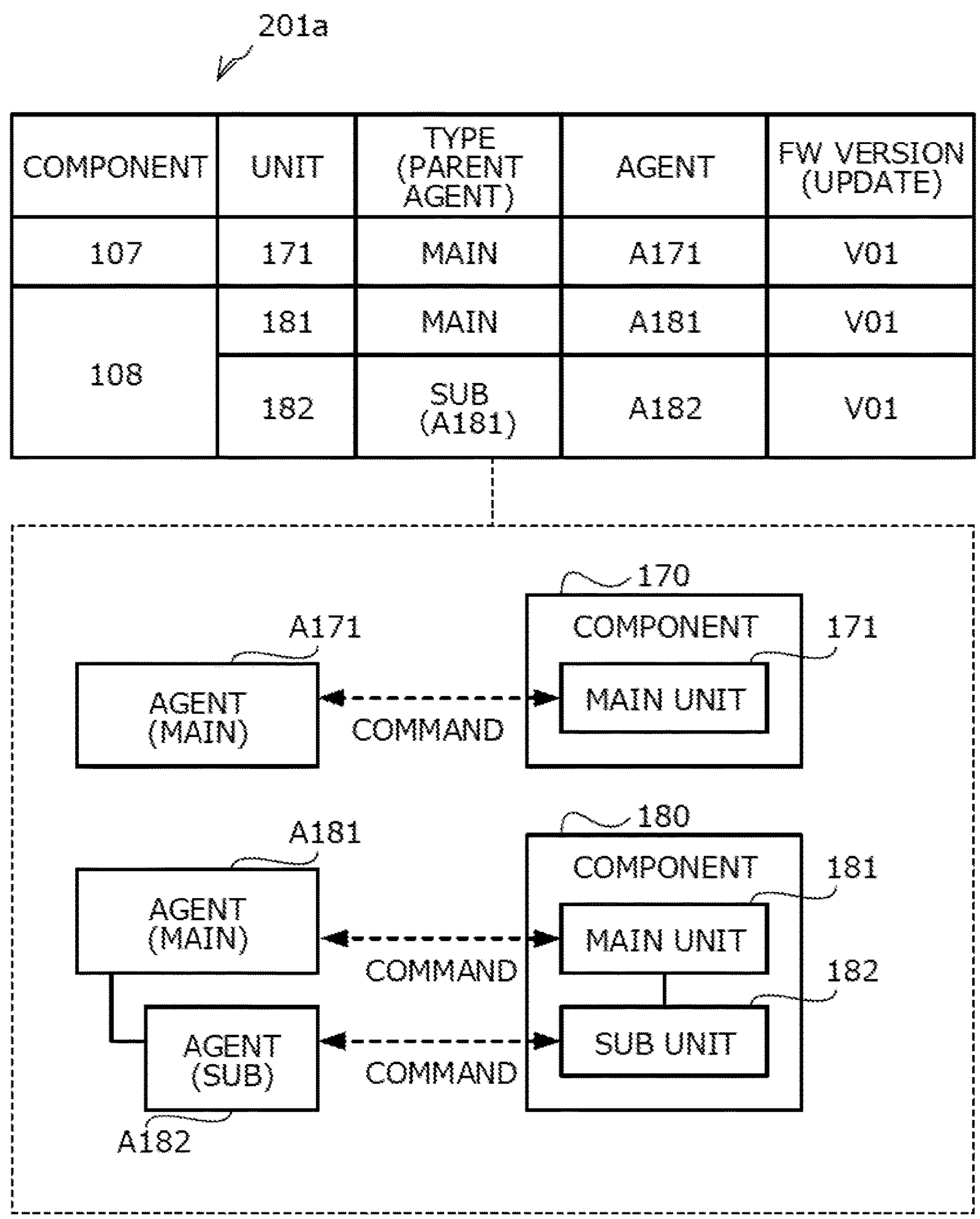
FIG. 7 is a diagram illustrating an example of COMP information according to the second embodiment.

The FW update process is executed using agents. The agents are logical processing subjects used to execute plural processes simultaneously in parallel. The agents are tasks, processes, threads, or the like, for example. As illustrated in FIG. 7, in the aforementioned component model, the FW update targets include the main unit 171 of the component 107 and the main unit 181 and subunit 182 of the component 108. FIG. 7 is a diagram illustrating an example of COMP information according to the second embodiment.

In this case, to execute FW update processes simultaneously in parallel, agents A171, A181, which respectively execute processing concerning the main units 171, 181, and an agent A182, which executes processing concerning the subunit 182, are used. The agent A171 exchanges commands with the main unit 171 to perform a process to update FW. In a similar manner, the agents A181, A182 respectively exchange commands with the main unit 181 and subunit 182 to perform FW update processes.

The COMP information 201*a* is information prescribing the relationship between the aforementioned agents (the agents A171, A181, A182) and the units (the main units 171, 181 and subunit 182). As illustrated in FIG. 7, the COMP information 201*a* associates the components with the respective units.

The COMP information 201*a* includes the type of each agent (main, sub) and a parent agent (the agent A181) which the sub agent (the agent A182) belongs to. Herein, the type of the agent corresponding to a main unit is “main” while the type of the agent corresponding to a subunit is “sub”. The sub-type agent belongs to an agent (main) corresponding to a main unit including the subunit. The COMP information 201*a* includes a version of FW updated in each unit.

As illustrated in FIG. 8, the progress management table 201*b* includes information concerning FW version and information concerning processing steps (maintenance mode setting, FW acquisition, FW installation, rebooting, maintenance mode termination, and update completion). FIG. 8 is a diagram illustrating an example of the progress management table according to the second embodiment.

The information of FW version includes “update” and “operation” information. In the update field of each agent, the version of FW expected to be newly installed by update is recorded. In the operation field, the same FW version as that in the update field is recorded at the beginning of the update process.

The maintenance mode setting is a step to activate an operation mode (the maintenance mode) in which normal operating processes are disabled in the corresponding unit. The maintenance mode is an operation mode in which the target unit executes processing concerning FW update.

When the target unit is the storage device 102 or tape library 103, for example, the maintenance mode is an operation mode in which acceptance of an access request of the host computer 300 is disabled. The FW acquisition is a step in which each unit acquires (downloads) FW from the monitor server 200. The FW installation is a step in which each unit stores new FW in a FW storage area on the memory and reads the new FW at the startup.

The rebooting is a step in which each unit is deactivated once and activated again. At the startup, each unit reads new FW. The maintenance mode termination is a step to shift each unit from the aforementioned maintenance mode to an operation mode in which an access request of the host computer 300 is accepted. The update completion indicates the state where updating by all the agents is completed and all the units as the FW update targets terminate the maintenance mode and restart the operation.

Information concerning each step of the maintenance mode setting, FW acquisition, FW installation, rebooting, and maintenance mode termination include “priority” and “state” information. In priority fields, code values (a priority specifying code) prescribing update priority are recorded. In the state fields, code values (an operation state code) are recorded in accordance with the progress status of processing in the step. The priority specifying code and operation state code are recorded in the progress management table 201*b* for each agent. The progress management table 201*b* therefore reflects the progress status of the update process in each unit.

The values of the priority specifying code and operation state code have meanings as illustrated in FIG. 9. FIG. 9 is a diagram illustrating an example of the code table according to the second embodiment. In the example of FIG. 9, the code values of 99, 0, 10, 11, . . . , 19, . . . are previously set.

Smaller values of the priority specifying code indicate higher levels of priority in principle. However, the code value of 99 of the priority specifying code represents that the processing at the step of interest (target processing) will not be executed (unexecuted) or it is not determined whether to execute the target processing (excluded from start determination). The value of 0 of the priority specifying code represents that the target processing will be executed with no precedent conditions (irrespective of the progress status of the other agents).

The code value of 10 of the priority specifying code represents that the target processing will be executed first. Each value of the priority specifying code, other than 0 and 99, indicates the execution priority of the target processing. In the example of FIG. 9, each value of the priority specifying code indicating the execution priority of the target processing is a number of two or more digits. For convenience of explanation, the code values excepting 0 have two digits below.

Each code value of the priority specifying code with the first digit being 0 indicates the priority at which an agent of the main type executes the targets processing. On the other hand, the code values of the priority specifying code with the first digit being 1 to 9 indicate the priority at which an agent of the sub type executes the target processing. For example, the code value of 11 of the priority specifying code indicates that the target processing will be executed first among the sub-type agents belonging to the main agent which is configured to execute the target processing first. By attaching different meanings to the first digit and the second or higher digits in the code values, the execution priority of the target processing is managed hierarchically.

Each code value of the operation state code indicates the execution state of the target processing. The code value of 99 of the operation state code indicates the state where the target processing is terminated (termination of the target processing). The code value of 0 of the operation state code indicates the state where the target processing is unexecuted (no execution of the target processing) or the state where the target processing is able to be executed with no precedent conditions (unconditional execution).

The code value of 10 of the operation state code indicates the state where the agent configured to execute the target processing first is executing the target step (being in execution of the target processing). The code value of 10 of the operation state code indicates the state where processing with the execution priority corresponding to the code value of 10 of priority specifying code is in execution. The code values of 11 or higher of the operation state code also indicate the state where processing with execution priority corresponding to the same code value as the priority specifying code is in execution. By managing the priority specifying code with the operation state code associated with each other, the execution state of the target processing is managed easily.

In some cases, plural agents are assigned to an identical code value of the priority specifying code. The plural agents assigned to an identical code value of the priority specifying code are able to simultaneously execute the target processing for the corresponding units.

In the example of FIG. 8, in the priority fields for each step of rebooting and maintenance mode termination, the second digit of the code value assigned to the agent A181 is identical to that of the code value assigned to the agent A182. In this case, the agent A181 reboots the main unit 181 at the same timing as the subunit 182 is rebooted. On the other hand, the agent A182 reboots the subunit 182 at the same timing as the main unit 181 is rebooted. The same applies for the processing of maintenance mode termination.

Back to FIG. 6, at updating FW, the pre-processing section 202 previously sets code values in the progress management table 201*b* and prepares FW to be provided for each unit. Initial code values are configured by the user or manager in advance. The pre-processing section 202 sets code values in the progress management table 201*b* based on the previously set initial code values.

The pre-processing section 202 generates the agents A171, A181, and A182 corresponding to the main units 171, 181 and the subunit 182. When sets of FW to be provided for the main units 171, 181 and subunit 182 are prepared as a file, the pre-processing section 202 extracts a set of FW to be provided for each unit. The pre-processing section 202 thereby performs preparation such that the agents A171, A181, A182 execute the FW update process.

The update processing section 203 activates the agents A171, A181, A182 generated by the pre-processing section 202 and executes the FW update process through the agents A171, A181, A182. The agents A171, A181, A182 refer to the progress management table 201*b* and execute FW provision, FW installation, and the like in the order of execution priority based on the priority specifying code.

Hereinafter, a description is further given of details and flows of processing executed by the pre-processing section 202 and update processing section 203 with reference to flowcharts and sequence diagrams.

Figure 10:
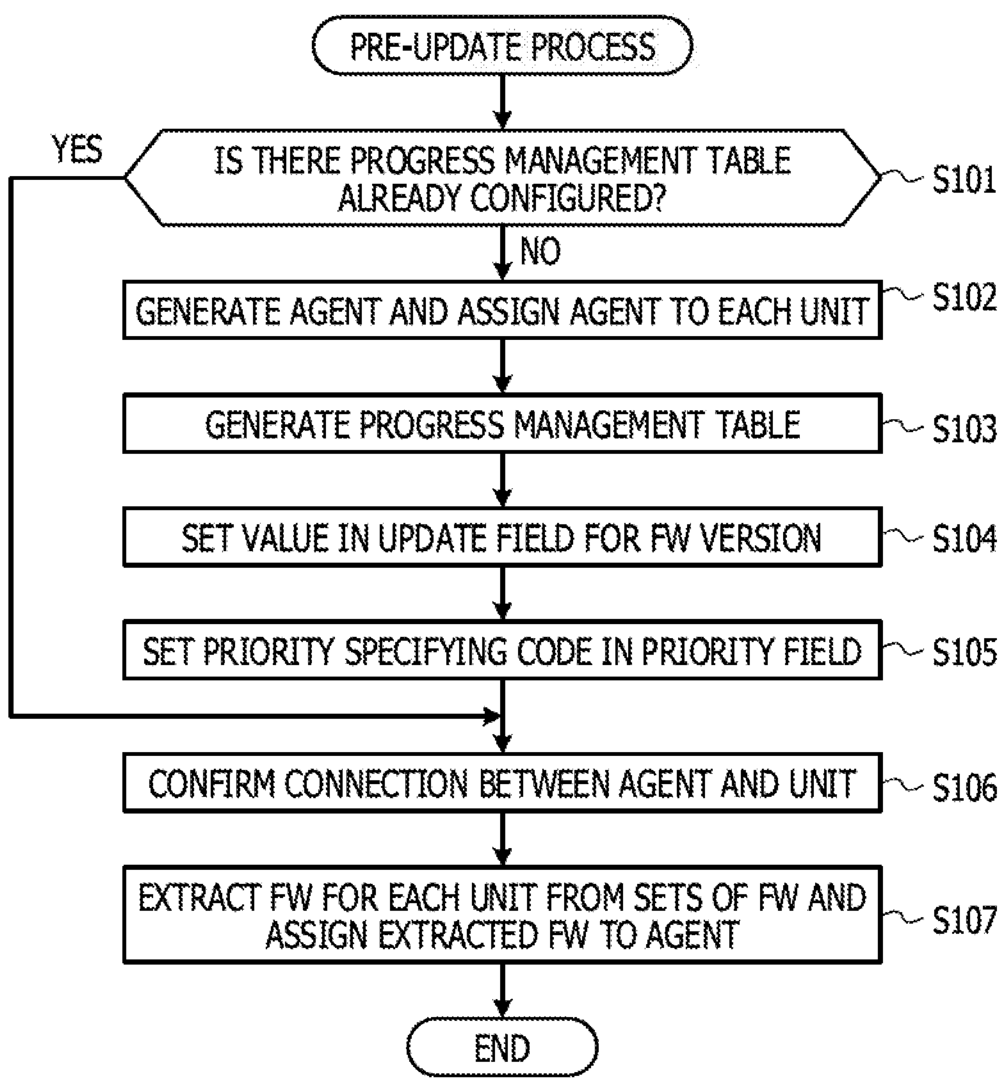
FIG. 10 is a flowchart illustrating a flow of a pre-update process according to the second embodiment.

With reference to FIG. 10, a description is given of a process (pre-update process) executed by the pre-processing section 202. FIG. 10 is a flowchart illustrating the flow of the pre-update process according to the second embodiment.

(S101) The pre-processing section 202 determines whether the progress management table 201*b* with the code values already set is included in the storage section 201. When the progress management table 201*b* with the code values already set is included in the storage section 201, the process goes to S106. On the other hand, when the progress management table 201*b* with the code values already set is not included in the storage section 201, the process goes to S102.

(S102) The pre-processing section 202 generates agents to be assigned to the respective units. The pre-processing section 202 assigns the generated agents to the respective units.

For example, the pre-processing section 202 generates the agent A171 to be assigned to the main unit 171. The pre-processing section 202 then assigns the agent A171 to the main unit 171. The pre-processing section 202 records the type (main) and identification information of the agent A171 in the fields corresponding to the main unit 171 in the COMP information 201*a* (see FIG. 7). The pre-processing section 202 generates the agents A181, A182 in a similar manner. The pre-processing section 202 records information about the agents A181, A182 in the COMP information 201*a*.

(S103) The pre-processing section 202 generates the progress management table 201*b*. In this process, the pre-processing section 202 generates the progress management table 201*b* including fields for code values corresponding to the items including FW version, maintenance mode setting, FW acquisition, FW installation, rebooting, maintenance mode termination, and update completion as illustrated in FIG. 8. The fields for code values are provided for each agent generated in S102. In the example of FIG. 8, the progress management table 201*b* includes the fields for code values corresponding to the respective agents A171, A181, A182.

The pre-processing section 202 provides the update and operation fields for the FW version. The pre-processing section 202 provides the priority and state fields for each step of the maintenance mode setting, FW acquisition, FW installation, rebooting, and maintenance mode termination. In the update field for the FW version, the version of FW to be installed in each unit by the update process is recorded. In the operation field for the FW version, the same FW version as the FW version recorded in the update field is recorded at the start of the update process. In the priority fields, code values of the priority specifying code are recorded. In the state fields, the code values of the operation state code are recorded.

At the time of S103, the pre-processing section 202 generates the progress management table 201*b* with 0 set in every field.

(S104) The pre-processing section 202 sets values of the FW version previously set in the COMP information 201*a* (see FIG. 7) in the update fields for the FW version in the progress management table 201*b*. For example, the pre-processing section 202 sets a value of V01 read from the COMP information 201*a*, in the update field for the FW version corresponding to the agent A171. The values in the update fields corresponding to the agents A181, A182 are set in a similar manner.

(S105) The pre-processing section 202 sets previously set code values of the priority specifying code, in the priority fields of each item of the progress management table 201*b*.

For example, the code value corresponding to the agent A181 is set smaller than the code value corresponding to the agent A171 when the maintenance mode setting requests to be executed for the main unit 181 prior to that for the main unit 171. In the example of FIG. 8, the code value corresponding to the agent A171 is set to 30 in the priority field for the maintenance mode setting. The code value corresponding to the agent A181 is set to 20. In this case, the processing of the agent A181, the code value of which is the smaller, is executed first.

The second digit of the code value (21 in this example) corresponding to the agent A182 of the sub-type, which belongs to the agent A181, is identical to the second digit of the code value corresponding to the agent A181. Accordingly, the processing of the agent A182, the code value of which is smaller than that of the agent A171, is executed prior to the processing of the agent A171. In this example, the maintenance mode setting is performed for the component 108 prior to the processing for the component 107.

Providing different meanings for the respective digits of code values as described above allows the execution priority of processing to be managed based on each group of units corresponding to the components. In addition to the maintenance mode setting, the pre-processing section 202 records code values of the priority specifying code in the priority fields for the FW acquisition, FW installation, rebooting, and maintenance mode termination. When some of the code values of the priority specifying code are identical in the same item, the agents having the identical code values are able to execute the target processing in parallel.

(S106) The pre-processing section 202 checks connection between the agents and units. For example, the pre-processing section 202 instructs the agent A171 to send a predetermined command to the main unit 171. The pre-processing section 202 checks whether the agent A171 receives a normal response from the main unit 171. When the agent A171 receives a normal response, the pre-processing section 202 determines that the main unit 171 and agent A171 are coupled normally. In a similar manner, the pre-processing section 202 also checks connection of the agents A181, A182.

Checking connections may use utility commands used in LAN communication, such as "ping" (operation check at the network level), "get unit state", or "show" (operation check at the system level), for example, are available. Alternatively, connections between the agents and units are checked using SCSI commands or the like, depending on the kind of connection between the monitor server 200 and components 107, 108.

(S107) The pre-processing section 202 extracts FW corresponding to each unit from sets of FW. The pre-processing section 202 assigns the extracted FW to the corresponding agent.

When sets of FW corresponding to the components 107, 108 are given as a single file, for example, the pre-processing section 202 extracts sets of FW to be provided to the main units 171, 181 and subunit 182 from the file. The pre-processing section 202 assigns the extracted sets of FW to the agents A171, A181, A182 corresponding to the main units 171, 181 and subunit 182, respectively.

When the processing of S107 is completed, the series of steps illustrated in FIG. 10 ends.

Figure 11:
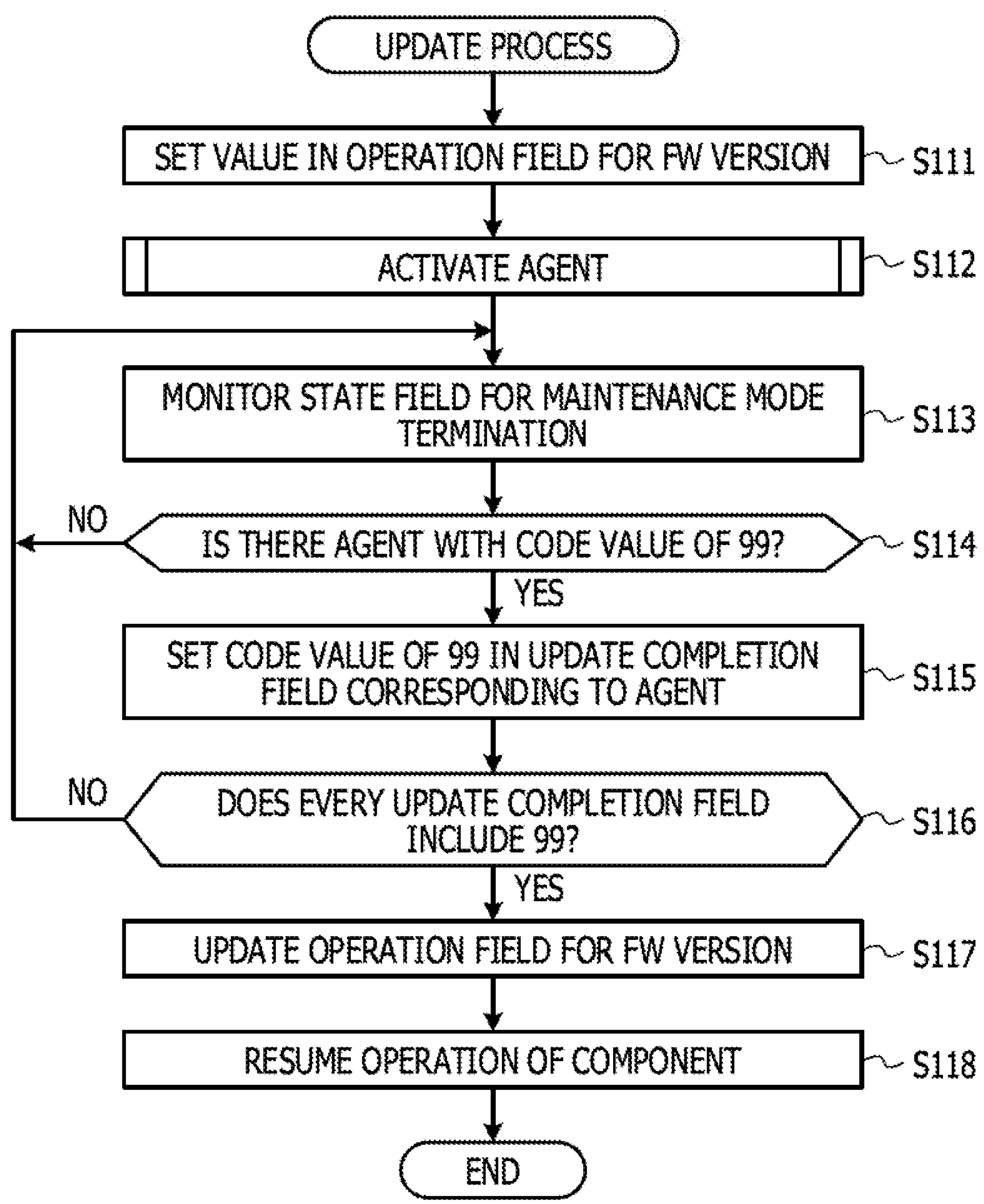
FIG. 11 is a flowchart illustrating a flow of an update process according to the second embodiment.

When the aforementioned pre-update process is completed, the update processing section 203 starts to execute the update process. Hereinafter, with reference to FIG. 11, a description is given of the flow of processing (the update process) executed by the update processing section 203. FIG. 11 is a flowchart illustrating the flow of the update process according to the second embodiment.

(S111) The update processing section 203 sets values in the operation fields for the FW version (the version of FW installed in each unit currently) in the progress management table 201*b*. When the version of FW currently installed in the main units 171, 181 and subunit 182 is V00, the update processing section 203 sets V00 in the "update" fields for the FW version. Herein, a description is given of an example of updating of FW with the FW version of V00 to FW with the FW version of V01 (see FIG. 8).

(S112) The update processing section 203 activates the agents A171, A181, A182 generated by the pre-processing section 202. The agents A171, A181, A182 activated by the update processing section 203 execute the FW update process for the main units 171, 181 and subunit 182, respectively. The FW update processing by the agents A171, A181, A182 is described later.

(S113) The update processing section 203 refers to the progress management table 201*b* to monitor the state fields for the maintenance mode termination. The code values recorded in the state fields for the maintenance mode termination indicate whether the maintenance mode is terminated in the main units 171, 181 and subunit 182. As described later, the code values are updated by the agents A171, A181, A182 after FW installation or rebooting for the main units 171, 181 and subunit 182 is completed.

(S114) The update processing section 203 checks whether there is any state field for the maintenance mode termination that includes the code value of 99. The code value of 99 indicates the end of the target processing (see FIG. 9). Specifically, the code value of 99 recorded in a state field for the maintenance mode termination indicates that the agent corresponding to the field which includes the code value of 99 finishes the maintenance mode termination.

The update processing section 203 determines whether there is any agent with the code value of 99 for the maintenance mode termination (whether there is any agent that finishes the maintenance mode termination). In this process, the update processing section 203 executes the aforementioned determination for agents with the code value other than 00 set in the update completion fields (agents which have not completed the update process). When there is an agent that has the code value of 99 for the maintenance mode termination, the process goes to S115. When there is no agent with the code value of 99 for the maintenance mode termination, the process goes to S113.

(S115) For the agent (referred to as the agent of interest) corresponding to the state field for the maintenance mode termination that includes the code value of 99, the update processing section 203 sets the code value of 99 in the update completion field in the progress management table 201*b*. In other words, the update processing section 203 recognizes that the update processing for a unit is completed when the step of maintenance mode termination for the unit is completed. The update processing section 203 records the code value indicating completion of FW update for the unit, in the progress management table 201*b* (in the update completion field of the agent of interest).

(S116) The update processing section 203 determines whether all the update completion fields of the progress management table 201*b* include the code value of 99. When all the update completion fields of the progress management table 201*b* include the code value of 99 (when FW update is completed in the main units 171, 181 and subunit 182), the process goes to S117. On the other hand, when all the update completion fields of the progress management table 201*b* do not include the code value of 99, the process goes to S113.

(S117, S118) The update processing section 203 updates the operation fields for the FW version in the progress management table 201*b* to the version V01 of FW newly installed in the units. The update processing section 203 controls the resuming of the operation of the components 107, 108. The host computer 300 is therefore permitted to access the components 107, 108, and the operation of the virtual tape library apparatus 100 is restarted. When the processing of S118 is completed, the series of steps illustrated in FIG. 11 ends.

Figure 12:
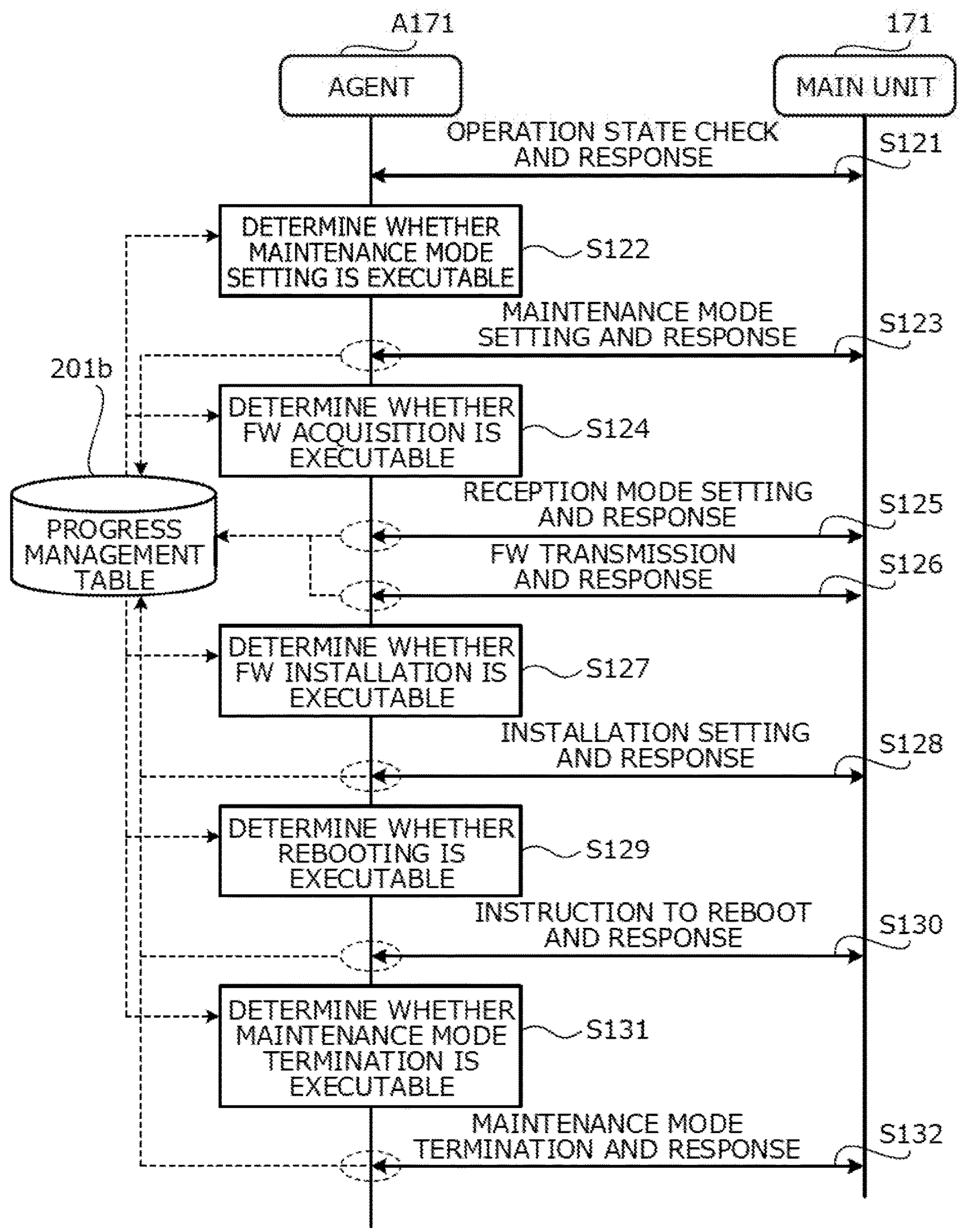
FIG. 12 is a sequence diagram illustrating the flow of processing executed by an agent, according to the second embodiment.
Figure 13:
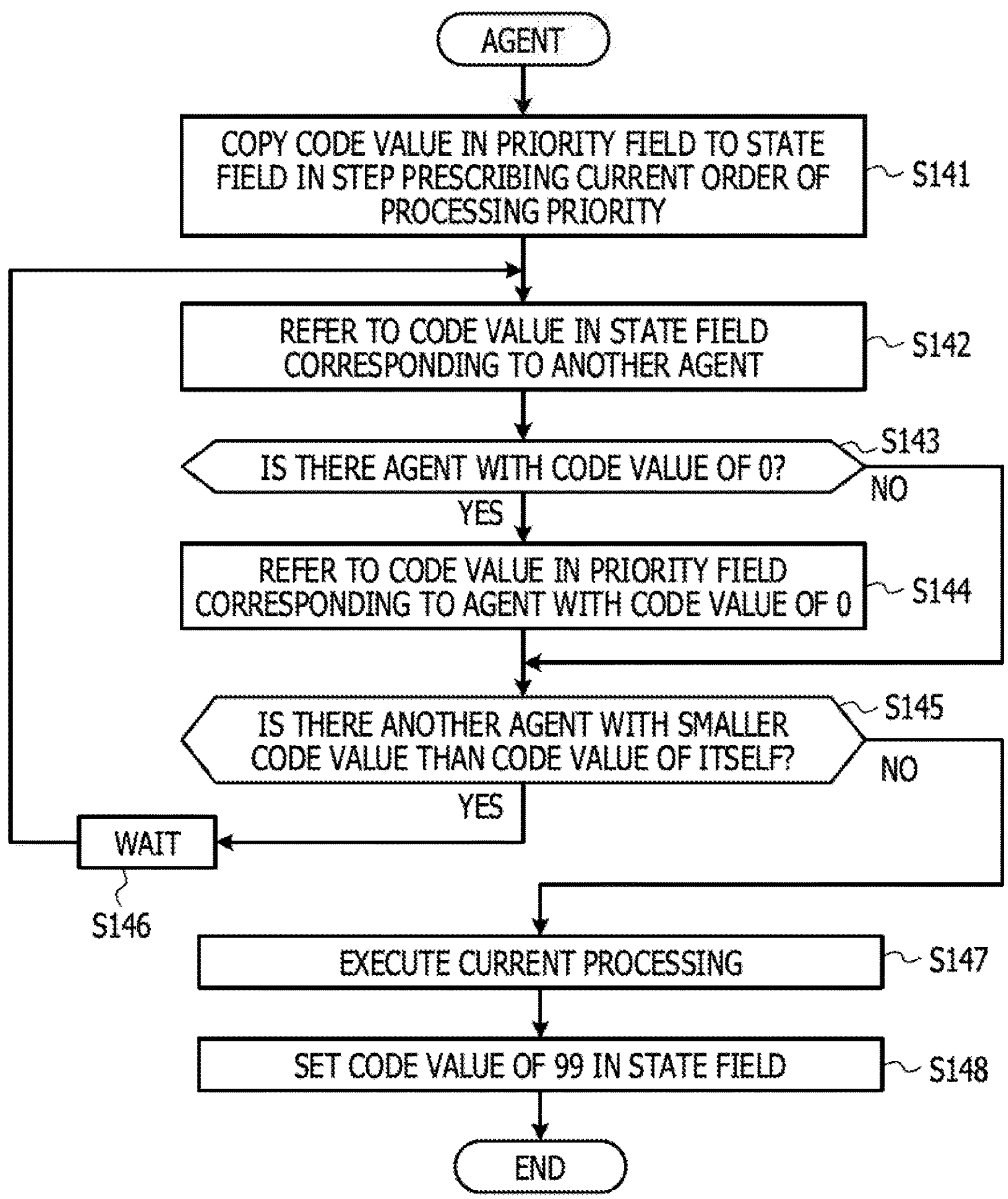
FIG. 13 is a flowchart illustrating the flow of processing executed in each step by an agent, according to the second embodiment.

Herein, a description is given of the flow of processing executed by an agent (corresponding to the processing of S112) with reference to FIGS. 12 and 13.

FIG. 12 is a sequence diagram illustrating the flow of processing executed by an agent according to the second embodiment. FIG. 13 is a flowchart illustrating the flow of the processing executed by an agent according to the second embodiment at each step. For convenience of explanation, a description is given of the flow of processing executed by the agent A171 corresponding to the main unit 171. The other agents execute the update processing in a similar manner.

First, a description is given with reference to FIG. 12.

(S121) The agent A171 sends a command to check the operation state to the main unit 171. For example, the agent A171 sends a command ("ping" or the like) to check whether the network between the agent A171 and main unit 171 is operating normally or a command ("get unit state" or the like) to refer to the system state of the main unit 171. The main unit 171 having received such a command returns a response to the command to the agent A171.

(S122) When the agent A171 checks that the main unit 171 is operating normally, the agent A171 determines whether the maintenance mode setting is executable for the main unit 171 with reference to the progress management table 201*b* (execution determination). When the maintenance mode setting is executable, the agent A171 moves the process to S123. When the maintenance mode setting is not executable, the agent A171 waits for a certain period of time (one to five seconds) and again performs the execution determination. The process concerning the execution determination is described later.

(S123) The agent A171 sends to the main unit 171, a command to set the operation mode of the main unit 171 to the maintenance mode (the operation mode in which processes in normal operation are disabled in the main unit 171). The main unit 171 having received the command shifts the operation mode to the maintenance mode and sends to the agent A171, a response indicating that the shift to the maintenance mode is completed.

The agent A171 having received the response from the main unit 171 records the code value of 99 in the state field for the maintenance mode setting corresponding to the agent A171 in the progress management table 201*b*. The agent A171 records in the progress management table 201*b*, the code value of 99 (see FIG. 9) of the operation state code indicating that the maintenance mode setting is finished in the main unit 171.

(S124) The agent A171 refers to the progress management table 201*b* and determines whether the FW acquisition is executable for the main unit 171 (execution determination). When determining that the FW acquisition is executable, the agent A171 moves the process to S125. On the other hand, when determining that the FW acquisition is not executable, the agent A171 waits for a certain period of time (one to five seconds, for example) and performs the execution determination again. The process concerning the execution determination is described later.

(S125) The agent A171 sends to the main unit 171, a command to control the main unit 171 into a state where the main unit 171 is able to receive FW from the agent A171 (reception mode). The main unit 171 having received the command performs a shift to the reception mode and returns to the agent A171, a response indicating that the shift to the reception mode is completed.

(S126) The agent A171 having received the response from the main unit 171 in S125 sends to the main unit 171, FW prepared for FW update of the main unit 171 by the pre-processing section 202. The main unit 171 having received the FW returns a response indicating normal reception of the FW to the agent A171.

The agent A171 having received the response from the main unit 171 records the code value of 99 in the state field for the FW acquisition corresponding to the agent A171 in the progress management table 201*b*. Specifically, the agent A171 records in the progress management table 201*b*, the code value of 99 (see FIG. 9) of the operation state code indicating that the FW acquisition is finished in the main unit 171.

(S127) The agent A171 refers to the progress management table 201*b* and determines whether the FW installation is executable in the main unit 171 (execution determination). When determining that the FW installation is executable, the agent A171 moves the process to S128. On the other hand, when determining that the FW installation is not executable, the agent A171 waits for a certain period of time (one to five seconds, for example) and performs the execution determination again. The process concerning the execution determination is described later.

(S128) The agent A171 sends to the main unit 171, a command to control the main unit 171 and install the FW sent to the main unit 171 in S126. The FW installation includes storing the FW in the memory 171*b* so that the main unit 171 reads the FW from the memory 171*b* at the startup. The main unit 171 having received the command installs the FW received from the main unit 171 in S126. The main unit 171 then returns to the agent A171, a response indicating that the installation of the FW is completed.

The agent A171 having received the response from the main unit 171 records the code value of 99 in the state field for the FW installation corresponding to the agent A171 in the progress management table 201*b*. The agent A171 records in the progress management table 201*b*, the code value of 99 (see FIG. 9) of the operation state code indicating that the FW installation is finished in the main unit 171.

(S129) The agent A171 refers to the progress management table 201*b* and determines whether the rebooting of the main unit 171 is executable (execution determination). When determining that the rebooting is executable, the agent A171 moves the process to S130. On the other hand, when determining that the rebooting is not executable, the agent A171 waits for a certain period of time (one to five seconds, for example) and performs the execution determination again. The process concerning the execution determination is described later.

(S130) The agent A171 sends to the main unit 171, a command ("reboot" or the like) to control and reboot the main unit 171 (instruction to reboot). The main unit 171 having received the command executes rebooting and reads the FW from the memory 171*b* to be activated. The main unit 171 then returns a response indicating that the rebooting is finished, to the agent A171.

The agent A171 having received the response from the main unit 171 records the code value of 99 in the state field for the rebooting corresponding to the agent A171 in the progress management table 201*b*. Specifically, the agent A171 records in the progress management table 201*b*, the code value of 99 (see FIG. 9) of the operation state code indicating that the rebooting of the main unit 171 is finished.

(S131) The agent A171 refers to the progress management table 201*b* and determines whether the maintenance mode termination of the main unit 171 is executable (execution determination). When determining that the maintenance mode termination is executable, the agent A171 moves the process to S132. On the other hand, when determining that the maintenance mode termination is not executable at the present time, the agent A171 waits for a certain period of time (one to five seconds, for example) and performs the execution determination again. The process concerning the execution determination is described later.

(S132) The agent A171 sends to the main unit 171, a command to shift the operation mode of the main unit 171 from the maintenance mode to the normal operation mode (the operation mode in which processes in normal operation are enabled in the main unit 171). The main unit 171 having received the command shifts the operation mode from the maintenance mode to the normal operation mode. The main unit 171 returns to the agent A171, a response indicating that the maintenance mode termination is completed.

The agent A171 having received the response from the main unit 171 records the code value of 99 in the state field for the maintenance mode termination corresponding to the agent A171 in the progress management table 201*b*. Specifically, the agent A171 records in the progress management table 201*b*, the code value of 99 (see FIG. 9) of the operation state code indicating that the maintenance mode termination is finished in the main unit 171.

When the processing in S132 is completed, the series of steps illustrated in FIG. 12 ends.

Next, a description is given of the processing concerning the execution determination (corresponding to the processing in S122, S124, S127, S129, S131) with reference to FIG. 13.

(S141) The agent A171 copies the code value in the priority field of the step of interest to the state field. The step of interest is a step for which the current processing priority is determined. The step of interest is the maintenance mode setting in the process of S122, the FW acquisition in the process of S124, the FW installation in the process of S127, the rebooting in the process of S129, or the maintenance mode termination in the process of S131.

(S142) The agent A171 refers to code values in the state fields of the step of interest corresponding to the other agents (the agents A181, A182) to search for an agent with the code value of 0.

(S143) When there is an agent with the code value of 0, the process goes to S144. When there is no agent with the code value of 0, the process goes to S145.

(S144) The agent A171 refers to the code value in the priority field for the step of interest corresponding to the agent with the code value of 0. At determining whether the processing corresponding to the step of interest is executable, the agent A171 uses the code value in the priority field corresponding to the agent with the code value of 0 included in the state field as the reference of the determination.

As illustrated in FIG. 9, the code value of 0 represents that the step of interest will be executed with no precedent conditions. The agent with the code value of 0 is able to execute the processing with no precedent conditions even when another agent is executing the process of the same step. In other words, the agent with the code value of 0 has no relation to another agent in the step of interest (no limitation on execution priority of processing). Accordingly, the other agents are able to execute the step of interest normally without taking into consideration of agents with the code value of 0 at determining whether the step is executable. As for the agents with the code value of 0 set in the state field, therefore, the agent A171 refers to the code value in the priority field.

(S145) The agent A171 determines whether there is another agent with the code value in the state field of the step of interest set smaller than the code value of the agent A171. In other words, the agent A171 thus determines whether there is another agent that is configured to execute the processing of the step of interest prior to the agent A171 according to the prescribed execution priority.

When there is another agent with the code value smaller than the code value of the agent A171, the process goes to S146. When there is no agent with the code value smaller than the code value of the agent A171, the process goes to S147. The process goes to S147 also when there is another agent with the same code value as that of the agent A171.

(S146) The agent A171 waits for a certain period of time (one to five seconds, for example). When the processing in S146 is finished, the process goes to S142.

(S147) The agent A171 executes the processing in the current step (the processing of the step of interest). For example, the s maintenance mode setting is executed in S122; the FW acquisition, in S124; the FW installation, in S127; the rebooting, in S129; and the maintenance mode termination, in S131.

(S148) The agent A171 sets the code value of 99 in the state field for the step of interest. The agent A171 records the operation state code indicating that the processing of the step of interest is completed, in the progress management table 201*b*. When the processing in S148 is completed, the series of steps illustrated in FIG. 13 is finished.

Hereinabove, the flow of the update process is described.

Figure 14:
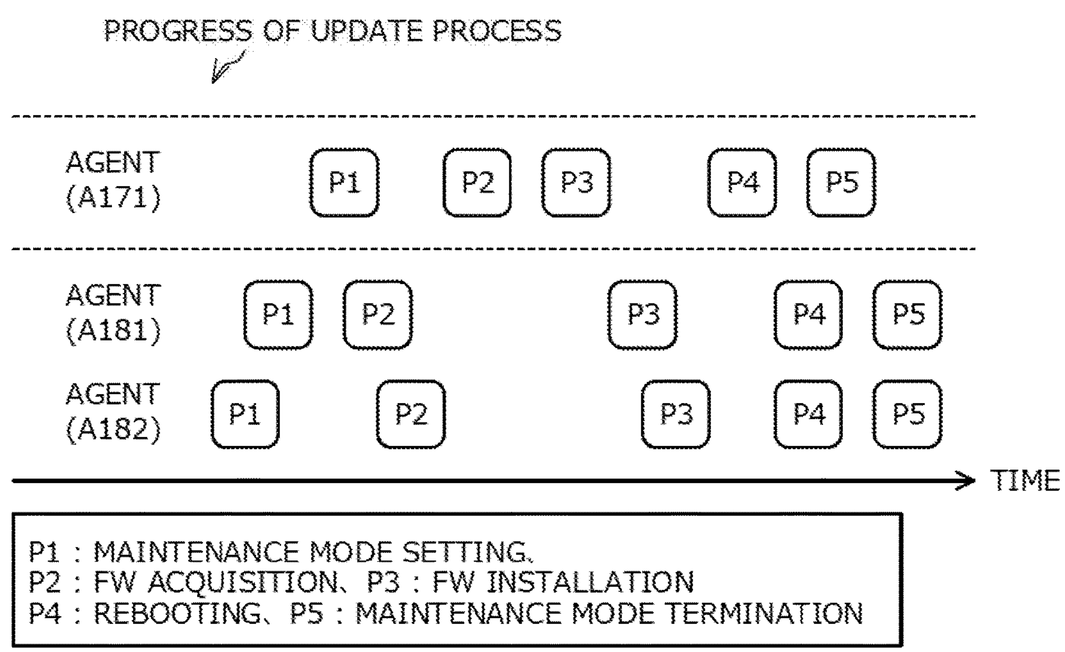
FIG. 14 is a diagram illustrating a progress of the update process according to the second embodiment.

The progress of the update process is described with reference to FIG. 14. FIG. 14 is a diagram illustrating an example of the progress of the update process according to the second embodiment.

In the example of FIG. 14, the agents A171, A181, A182 control the processing priority of "maintenance mode setting" (P1), "FW acquisition" (P2), "FW installation" (P3), "rebooting" (P4), and "maintenance mode termination" (P5).

By using the aforementioned progress management table 201*b*, as illustrated in FIG. 14, the agents A171, A181, A182 execute in parallel, processes which are able to be executed in parallel and execute in order, processes that request to be executed in the prescribed order. Accordingly, the processes from P1 to P5 are able to be efficiently executed considering the order of processing priority of the agents A171, A181, A182.

For example, it is assumed that the order of processing priority of the components 107, 108 is determined and the processes for the main unit 181 and subunit 182 included in the component 108 are able to be executed in parallel. In this case, using the progress management table 201*b* managed with two-digit code values easily implements timing control between the processes of the agent A171 and the processes of the group of the agents A181, A182.

For convenience of explanation, the mechanism to simultaneously update FW of all of the components is described using the component model as described above. The technique of the second embodiment is applicable to a system performing time difference control which updates some components as FW update targets first and updates the other components a predetermined period of time later.

For example, one of the roles of the tape library 103 at the back end is backing up data when the storage device 102 functioning as the TVC is running out of free space. The tape library 103 also plays a role of moving data to the tapes 132*a*, 132*b*, which are high-capacity portable storage media, for backup.

Considering the aforementioned roles, the tape library 103, which has low readiness for an access request of the host computer 300, may be configured to have a delay in the timing to update FW. For example, it is possible to implement a mechanism: to first perform the update process for the tape library 103 while dealing with access requests made during the update process by using the storage device 102; and then to update FW of the storage device 102 at the timing when the update process for the tape library 103 is completed.

If different timings to executed the update process are set depending on the roles of the components and units as described above, the system is able to continue working with some of the components and units, thus shortening the downtime due to FW update.

In the case of executing update of the tape library 103 at a different timing, hardware elements within the virtual tape controller 101 controlling the tape library 103 may be configured to be updated at the same timing as the tape library 103. In the case of executing update of the tape library 103 at a different timing, the code value of 99 are recorded in advance in the fields for the units configured to continue working, in the progress management table 201*b*. As for the units in which FW is expected to be updated, the update processing section 203 executes the aforementioned update process. Using the progress management table 201*b* has an advantage of facilitating operation to finely control the timings to update.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An update control method executed by a processor included in an update control apparatus configured to update control programs respectively set up in a plurality of computers, the update control method comprising:

acquiring update information and new control programs to be provided to the plurality of respective computers, the update information indicating update priority of the control programs of the plurality of computers and a progress status of the update;

providing the new control programs to the plurality of computers;

updating the progress status included in the update information based on information about a computer with the update of the control program completed among the computers;

determining, based on the updated progress status, timings to reboot the plurality of respective computers such that the control programs of the plurality of computers are updated according to the update priority indicated by the update information; and updating the control programs of the plurality of computers based on the determined timings, the update information includes information indicating an order of acquisition priority in which the plurality of computers acquire the new control programs, and the providing includes providing the new control programs to the plurality of computers so that the plurality of computers acquire the new control programs in the order of acquisition priority, the update information includes information indicating an order of priority for setting an operation mode in the plurality of computers, the operation mode being a mode in which a process concerning the update of the control program is to be executed, and the updating the control programs includes updating the control programs so that the plurality of computers are set to the operation mode in the order of priority for setting the operation mode.

2. The update control method according to claim 1, wherein each of the plurality of computers includes a memory device including a storage area configured to store the control program, and reads the control program from the storage area and enables the setup of the control program at startup, the update information includes information indicating an order of storage process execution priority in which the plurality of computers store the new control programs in the storage areas, and the providing includes controlling the plurality of computers so that the plurality of computers store the new control programs in the storage areas in the order of storage process execution priority.

3. The update control method according to claim 1, wherein the update information includes information indicating a reboot order in which the plurality of computers execute the reboot, and when there are two or more computers allowed to execute the reboot simultaneously among the plurality of computers, the information indicating the reboot order is set to have the order such that the two or more computers execute the reboot simultaneously, and the determining includes determining the timings such that the two or more computers execute the reboot at the same timing.

4. The update control method according to claim 1, wherein the progress status includes information indicating that the update of each of the control programs is completed or is not completed.

5. An update control apparatus which updates control programs respectively set up in the plurality of computers, the update control apparatus comprising:

a memory; and a processor coupled to the memory and configured to:

acquire update information and new control programs to be provided to the plurality of respective computers, the update information indicating update priority of the control programs of the plurality of computers and a progress status of the update;

provide the new control programs to the plurality of computers;

update the progress status included in the update information based on information about a computer with the update of the control program completed among the plurality of computers;

determine, based on the updated progress status, the timings to reboot the plurality of respective computers such that the control programs of the plurality of computers are updated according to the update priority indicated by the update information; and update the control programs of the plurality of computers based on the determined timings, the update information includes information indicating an order of acquisition priority in which the plurality of computers acquire the new control programs, and the processor is configured to provide the new control programs to the plurality of computers so that the plurality of computers acquire the new control programs in the order of acquisition priority, the update information includes information indicating an order of acquisition priority in which the plurality of computers acquire the new control programs, and the processor is configured to provide the new control programs to the plurality of computers so that the plurality of computers acquire the new control programs in the order of acquisition priority.

6. The update control apparatus according to claim 5, wherein each of the plurality of computers includes a memory device including a storage area configured to store the control program, and reads the control program from the storage area and enables the setup of the control program at startup, the update information includes information indicating an order of storage process execution priority in which the plurality of computers store the new control programs in the storage areas, and the providing includes controlling the plurality of computers so that the plurality of computers store the new control programs in the storage areas in the order of storage process execution priority.

7. The update control apparatus according to claim 5, wherein the plurality of computers include a memory device including a storage area and a library device configured to backup data stored in the storage area to a portable recording medium, and the processor is configured to continue an operation of the memory device while executing update of the control program of the library device.

8. A non-transitory computer-readable storage medium storing a program that causes a processor included in an update control apparatus which updates control programs respectively set up in a plurality of computers to execute a process, the process comprising:

acquiring update information and new control programs to be provided to the plurality of respective computers, the update information indicating update priority of the control programs of the plurality of computers and a progress status of the update;

providing the new control programs to the plurality of computers;

updating the progress status included in the update information based on information about a computer with the update of the control program completed among the plurality of computers;

determining, based on the updated progress status, timings to reboot the plurality of respective computers such that the control programs of the plurality of computers are updated according to the update priority indicated by the update information; and updating the control programs of the plurality of computers based on the determined timings, the update information includes information indicating an order of acquisition priority in which the plurality of computers acquire the new control programs, and the providing includes providing the new control programs to the plurality of computers so that the plurality of computers acquire the new control programs in the order of acquisition priority, the update information includes information indicating an order of priority for setting an operation mode in the plurality of computers, the operation mode being a mode in which a process concerning the update of the control program is to be executed, and the updating the control programs includes updating the control programs so that the plurality of computers are set to the operation mode in the order of priority for setting the operation mode.

9. The storage medium according to claim 8, wherein each of the plurality of computers includes a memory device including a storage area configured to store the control program, and reads the control program from the storage area and enables the setup of the control program at startup, the update information includes information indicating an order of storage process execution priority in which the plurality of computers store the new control programs in the storage areas, and the providing includes controlling the plurality of computers so that the plurality of computers store the new control programs in the storage areas in the order of storage process execution priority.

* * * * *